(12) United States Patent
Mishra et al.

(10) Patent No.: US 8,611,472 B2
(45) Date of Patent: Dec. 17, 2013

(54) CARRIER FREQUENCY OFFSET ESTIMATION SCHEME, FOR DIGITAL STANDARDS WITH MPSK MODULATED PREAMBLE

(75) Inventors: Saurabh Mishra, Madhepura (IN); Subrahmanya Kondageri Shankaraiah, Bangalore (IN); Subramanian Harish Krishnan, Bangalore (IN)

(73) Assignee: Saankhya Labs Private Limited, Bangalore (IN)

( * ) Notice: Subject to any disclaimer, the term of this patent is extended or adjusted under 35 U.S.C. 154(b) by 0 days.

(21) Appl. No.: 13/447,073

(22) Filed: Apr. 13, 2012

(65) Prior Publication Data

US 2012/0269297 A1   Oct. 25, 2012

(30) Foreign Application Priority Data

Apr. 25, 2011   (IN) .......................... 1404/CHE/2011

(51) Int. Cl.
  *H03D 3/22*   (2006.01)
(52) U.S. Cl.
  USPC ............ 375/329; 375/326; 375/260; 375/347

(58) Field of Classification Search
  None
  See application file for complete search history.

(56) References Cited

U.S. PATENT DOCUMENTS

2011/0116562 A1*   5/2011   Li et al. .......................... 375/260
2011/0149929 A1*   6/2011   Kleider et al. ................ 370/338

* cited by examiner

*Primary Examiner* — Leon-Viet Nguyen
(74) *Attorney, Agent, or Firm* — Klarquist Sparkman, LLP (57) ABSTRACT

A receiver for reducing acquisition time of a Carrier Frequency Offset (CFO) of an input intermediate frequency (IF) signal with M-PSK modulated preamble using spectral based analysis is provided. The receiver includes an analog to digital converter that converts the input IF signal into a digital signal, a down conversion unit that down converts the digital signal to a baseband complex signal, and a CFO estimation block that estimates the CFO. The CFO estimation block includes a carrier harmonic generation unit that generates an output of carrier $M^{th}$ harmonic without modulation in the baseband complex signal, a spectral mapping unit that spectrally maps the carrier harmonic using complex Fast Fourier Transform, a spectral analysis unit that performs peak search on the spectrally mapped carrier $M^{th}$ harmonic to obtain a peak position ($P_{POS}$), and a carrier frequency offset estimation unit that receives the peak position ($P_{POS}$) and estimates the CFO.

9 Claims, 6 Drawing Sheets

CARRIER FREQUENCY OFFSET ESTIMATION SCHEME, FOR DIGITAL STANDARDS WITH MPSK MODULATED PREAMBLE

BACKGROUND

1. Technical Field

The embodiments herein generally relate to Carrier Frequency Offset (CFO) estimation in receiver system, and, more particularly to a scheme for the CFO estimation for wire-line as well as wireless communication standards in the receiver systems.

2. Description of the Related Art

Figure 1:
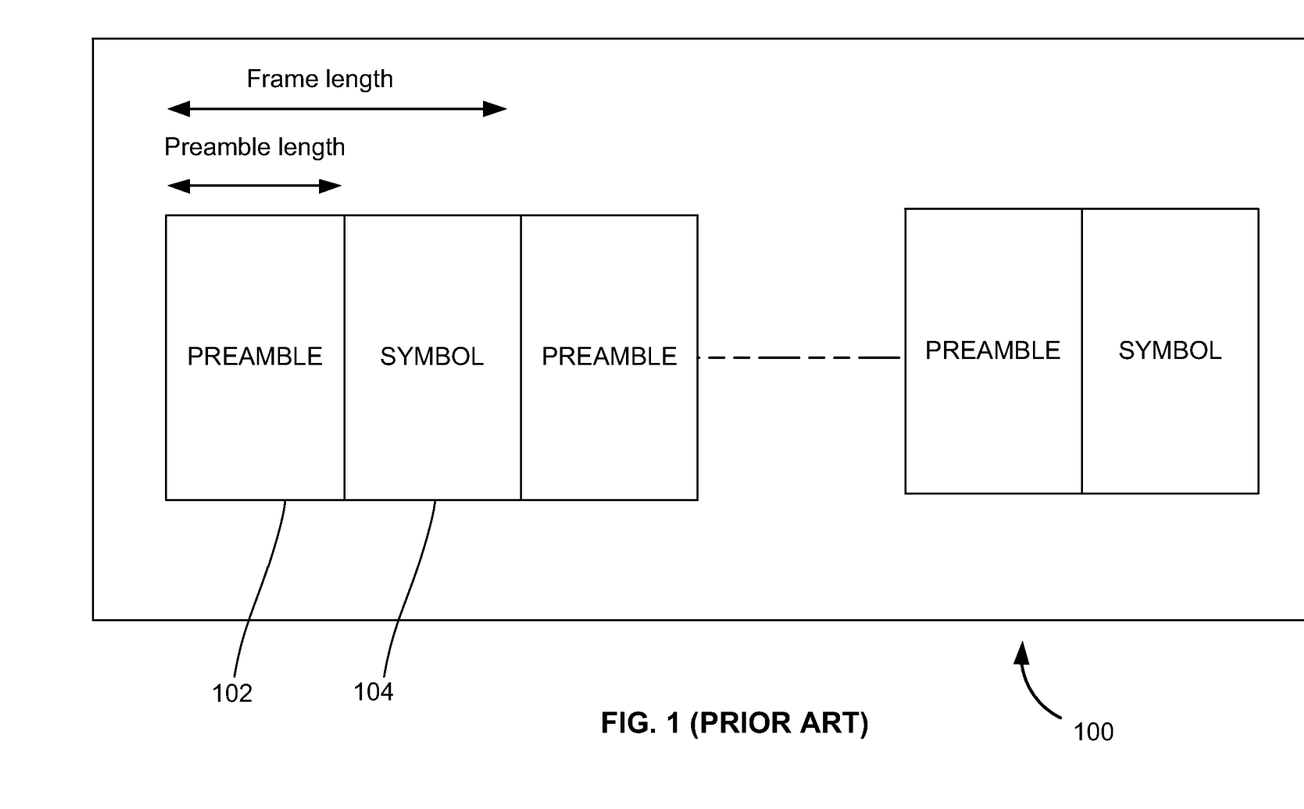
FIG. 1 illustrates structure of a frame of a preamble based standard.

Data transmission is organised as a frame in wireless standards. FIG. 1 illustrates a frame structure 100 of a preamble based standard. The frame structure 100 consists of sequence of data symbols 104 proceeded by a preamble 102. The preamble 102 is a known data and is typically used for synchronisation and channel estimation. The preamble may be modulated with M-ary Phase Shift Keying (MPSK). The MPSK modulated preambles are generated using a pseudo-random generator with constant and variable seed states resulting in constant phase preambles and variable phase preambles respectively. Typically, $M^{th}$ power of M-PSK modulated preamble generates $M^{th}$ harmonic carrier with no modulation. For example, S is a BPSK modulated signal and is derived as:

$$S(n) = A(n)\cos(F_c(n) + M \times \pi)$$

Where, M is the time that may range from 0 to n, while A(n) is time dependent amplitude and $F_c(n)$ is a carrier frequency. Performing a squaring operation on the above equation results in the following equation:

$$S^2(n) = \frac{A^2(n)}{2}[1 + \cos(2F_c(n) + 2 \times m \times \pi)]$$

The above equation contains a second harmonic of the carrier with a phase modulation removed. Similarly, fourth power of a Q-PSK modulated signal will result in a fourth harmonic carrier. Carrier Frequency Offset (CFO) estimation is required for coherent demodulation of a baseband complex signal. It is also required to realise fast and reliable carrier frequency acquisition for designing high performance communication systems.

Currently, the Carrier Frequency Offset (CFO) is estimated by using a time domain based estimation followed by a Phase Lock Loop (PLL). In this scheme, the tracking bandwidth strongly depends on a loop bandwidth of the PLL. Any increase in the loop bandwidth leads to an increase in CFO estimation variance. The increased CFO estimation variance makes the CFO unreliable under a low Signal to Noise Ratio (SNR) and strong multipath condition. Additionally, the PLL based methods also suffer from slow receiver acquisition due to a large loop filter bandwidth of the PLL required for large CFO estimation. This limits the CFO acquisition range in order of KHz for a 10-20 MHz bandwidth signal.

Existing CFO estimation methods are either sensitive to a Symbol Timing Offset (STO) or require symbol time recovery prior to the CFO estimation. Such methods are not capable for concurrent estimation of CFO and Symbol Timing Offset (STO) and result in slowing down of receiver acquisition. Additionally, decision directed methods of CFO estimation use decoded samples which is achievable only if symbol timing recovery is done prior to the CFO estimation. Decision directed methods are also influenced by the low SNR since decoded symbol reliability is reduced which further reduces the estimate.

Accordingly, there remains a need for a scheme for CFO estimation which enables reliable and fast acquisition in large CFO, low SNR and strong multipath conditions.

SUMMARY

In view of the foregoing, an embodiment herein provides a receiver for reducing acquisition time of Carrier Frequency Offset (CFO) of an input Intermediate Frequency (IF) signal with M-PSK modulated preamble using spectral based analysis. The receiver is capable of supporting multiple communication standards (wireline or wireless standards). The receiver includes an Analog to Digital Converter (ADC) that converts the input IF signal into a digital signal, a down conversion unit that down converts the digital signal to a baseband complex signal, and a CFO estimation block that estimates the CFO. The CFO estimation block includes (i) a carrier harmonic generation unit that generates an output of carrier $M^{th}$ harmonic without modulation in the baseband complex signal, (ii) a spectral mapping unit that spectrally maps the carrier Mth harmonic using a complex Fast Fourier Transform (FFT), (iii) a spectral analysis unit that performs peak search on the spectrally mapped carrier $M^{th}$ harmonic to obtain a peak position ($P_{POS}$), and (iv) a carrier frequency estimation unit that receives the peak position ($P_{POS}$) to estimate the CFO. The CFO estimation in the receiver is carried out at symbol rate to reduce implementation complexity.

The receiver further includes (i) a signal conditioning filter that rejects unwanted out-of-band signals from the baseband complex signal, (ii) a sample rate converter that converts the baseband complex signal to symbol rate, (iii) a numerically controlled oscillator (NCO) that generates a complex signal for a down conversion, and (iv) a coherent demodulator that demodulates the baseband complex signal.

In another aspect, a receiver for reducing acquisition time of carrier frequency offset (CFO) with constant phase M-PSK modulated preamble of input Intermediate Frequency (IF) signal is provided. The receiver includes (i) a down conversion unit that down converts the input IF signal into a baseband complex signal and (ii) a CFO estimation block. The CFO estimation block includes (a) a data selection unit that selects a data p(n) based on one or more constant phase M-PSK modulated preambles of the baseband complex signal, (b) a down-sampling unit that performs down-sampling of a selected baseband complex signal and generates a downsampled signal, (c) a $M^{th}$ power logic unit that processes the downsampled signal to generate a carrier $M^{th}$ harmonic without modulation, (d) a spectral domain mapping unit that spectrally maps the carrier $M^{th}$ harmonic by computing a complex Fast Fourier Transform (FFT), (e) a non-coherent averaging unit that averages a magnitude of spectrally mapped signal with a magnitude of a signal that is previously spectrally mapped, (f) a spectral analysis unit that performs a peak search on averaged spectral mapping signal to detect $M^{th}$ harmonic of the selected baseband complex signal and obtains a peak position ($P_{POS}$), and (g) a carrier frequency offset estimation unit that receives the $P_{POS}$ from the spectral analysis unit and estimates the CFO. The down-sampling of the selected signal enables reliable CFO estimates in low SNR condition and strong multipath.

In yet another aspect, a receiver for reducing acquisition time of Carrier Frequency Offset (CFO) with a variable phase M-PSK modulated preamble of an input Intermediate Frequency (IF) signal. The receiver includes (i) a down conversion unit that down converts the input IF signal into a baseband complex signal and (ii) a CFO estimation block. The CFO estimation includes (i) a data selection unit that selects a data p(n) signal based on one or more variable phase M-PSK modulated preambles of the baseband complex signal, (ii) a $M^{th}$ power logic unit that generates a carrier $M^{th}$ harmonic without modulation of the selected baseband complex signal, (iii) a spectral domain mapping unit that spectrally maps the carrier $M^{th}$ harmonic by performing a complex FFT, (iv) a spectral analysis unit that performs a peak search on averaged spectral mapping signal to detect $M^{th}$ harmonic of the selected baseband complex signal and obtains a peak position ($P_{POS}$), and (v) a carrier frequency offset estimation unit that receives the $P_{POS}$ from the spectral analysis unit and estimates the CFO.

In yet further aspect, a method for reducing acquisition time of Carrier Frequency Offset (CFO) of an input intermediate frequency (IF) signal with $M^{th}$ power of a phase M-PSK modulated preamble of the input IF signal in a receiver is provided. The method uses spectral analysis and also capable of supporting multiple communication standards (wire-line or wireless). When the phase of the M-PSK modulated preamble is constant, the method includes (i) equaling number of iterations j to N, (ii) performing a data selection to output a selected signal p(n), (iii) down-sampling the selected signal p(n) to obtain better resolution for a spectral mapping, (iv) generating a carrier $M^{th}$ harmonic without modulation of the selected signal p(n), (v) performing a spectral mapping of the carrier $M^{th}$ harmonic by computing complex Fast Fourier Transform to obtain a spectrally mapped signal, (vi) performing non-coherent averaging over the spectrally mapped signal to avoid affect of phase variation on CFO estimations to obtain an averaged spectrally mapped signal, (vii) decrementing a value of the j, (viii) performing a spectral analysis of the averaged spectral mapping signal by a peak search to obtain a peak position ($P_{POS}$) only when the j is zero otherwise again perform the data selection, and (ix) estimating the CFO based on the $P_{POS}$.

The method further includes (i) performing a data selection to output a selected signal p(n), (ii) generating a carrier $M^{th}$ harmonic without modulation of the selected signal p(n), (iii) performing spectral mapping of the carrier $M^{th}$ harmonic of the selected signal by computing complex Fast Fourier Transform to obtain spectrally mapped signal, (iv) performing spectral analysis of the spectrally mapped signal by a peak search to detect $M^{th}$ harmonic of the selected signal and to obtain peak position ($P_{POS}$) and (v) estimating said CFO based on said $P_{POS}$ only when the phase of the M-PSK modulated preamble is variable equaling number of iterations j to N.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

These and other features, aspects, and advantages of the present embodiment will become better understood with regard to the following description, appended claims, and accompanying drawings, in which:

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Referring now to the drawings, and more particularly to FIG. 2 through FIG. 5, where similar reference characters denote corresponding features consistently throughout the figures, there are shown preferred embodiments.

Figure 2:
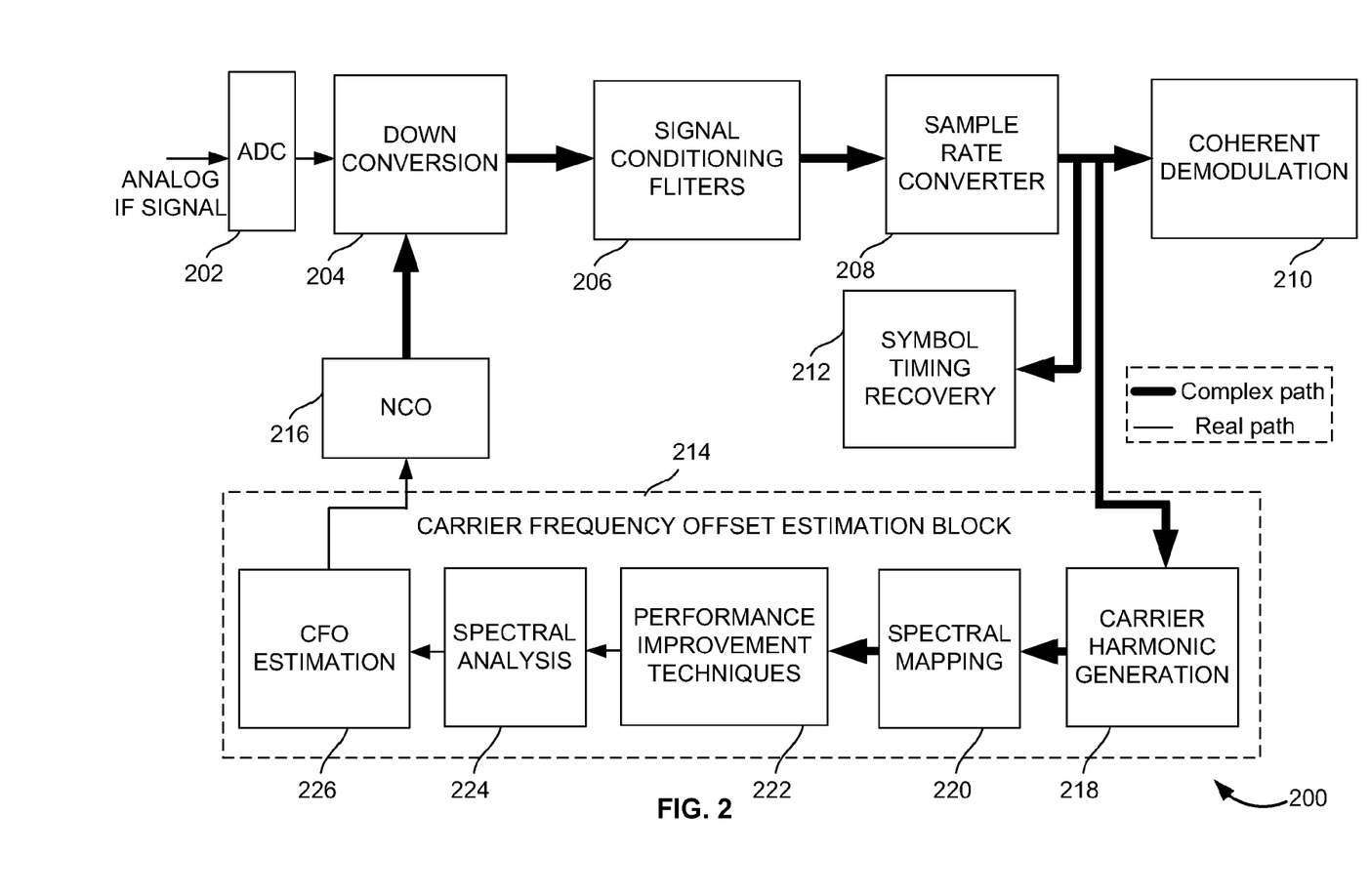
FIG. 2 is a block diagram of a receiver illustrating estimation of a Carrier Frequency Offset (CFO) according to an embodiment herein.

FIG. 2 is a block diagram of a receiver 200 illustrating estimation of a Carrier Frequency Offset (CFO) according to an embodiment herein. The block diagram includes an Analog to Digital Converter (ADC) 202, a down conversion block 204, a signal conditioning filter 206, a sample rate converter 208, a coherent demodulation block 210, a symbol timing recovery block 212, a CFO estimation block 214, and a Numerically Controlled Oscillator (NCO) 216. The CFO estimation block 214 further includes a carrier harmonic generation unit 218, a spectral mapping unit 220, a performance improvement techniques unit 222, a spectral analysis unit 224, and a CFO estimation unit 226.

It is necessary to convert an analog signal into a digital signal for performing digital demodulation. The ADC 202 receives an analog IF signal and converts into a digital IF signal for further processing in a digital domain. The down conversion block 204 down converts the digital IF signal to a baseband complex signal with frequency and phase offset correction. The down conversion is achieved using a combination of mixer (not shown in FIG. 2) and the NCO 216. The mixer is used for frequency translation to bring the digital IF signal to the baseband complex signal using a complex signal generated by the NCO 216. The NCO 216 generates the complex signal for down conversion using a required input frequency and a phase value obtained from carrier frequency offset estimation block 214. The signal conditioning filter 206 filters out unwanted adjacent bands to improve selectivity and also performs a spectral shaping (such as root raised cosine (RRC)), if required. For an example most of the single carrier standards use RRC filter for spectral shaping. Generally ADC 202 samples the received signal at a higher symbol rate to avoid aliasing effect. Hence, it is required to down-sample the baseband complex signal to a required symbol rate. The sample rate converter 208 is performing resampling operation on baseband complex signal to obtain the required symbol rate based on multiple communication standards specification. The required symbol rate is decided based on the standard, modulation techniques and a required bit rate after demodulation. The CFO estimation can be carried anywhere in the signal path of FIG. 1. It is required to correct CFO prior to a frame synchronisation for a reliable operation, because frame detection schemes are influenced by tuner induced impairments. Implementation complexity involved in CFO estimation depends on a sampling rate of the signal which inputs to the CFO estimation block. The lowest sampling rate available in signal path of FIG. 1 is equal to the symbol rate which is specified by the multiple communication standards. In one embodiment, the CFO estimation is carried out at symbol rate to reduce implementation complexity. The carrier harmonic generation unit 218 uses intrinsic properties of M-PSK modulated preamble to generate $M^{th}$ carrier harmonic after performing $M^{th}$ power of the baseband complex signal. The spectral mapping unit 220 receives the $M^{th}$ carrier harmonic and performs spectral domain analysis to obtain a spectrally mapped signal using spectral mapping techniques such as FFT. The spectral domain analysis used to minimize the acquisition time. The performance improvement techniques unit 222 performs a non-coherent averaging of the spectrally mapped signal when the M-PSK modulated preamble is constant. The spectral analysis unit 224 performs a peak search operation on the spectrally mapped signal to obtain a peak position ($P_{POS}$). The Peak position ($P_{POS}$) is sent to the carrier frequency offset estimation unit 226 to estimate the required input frequency and the phase value for the NCO 216.

Figure 3:
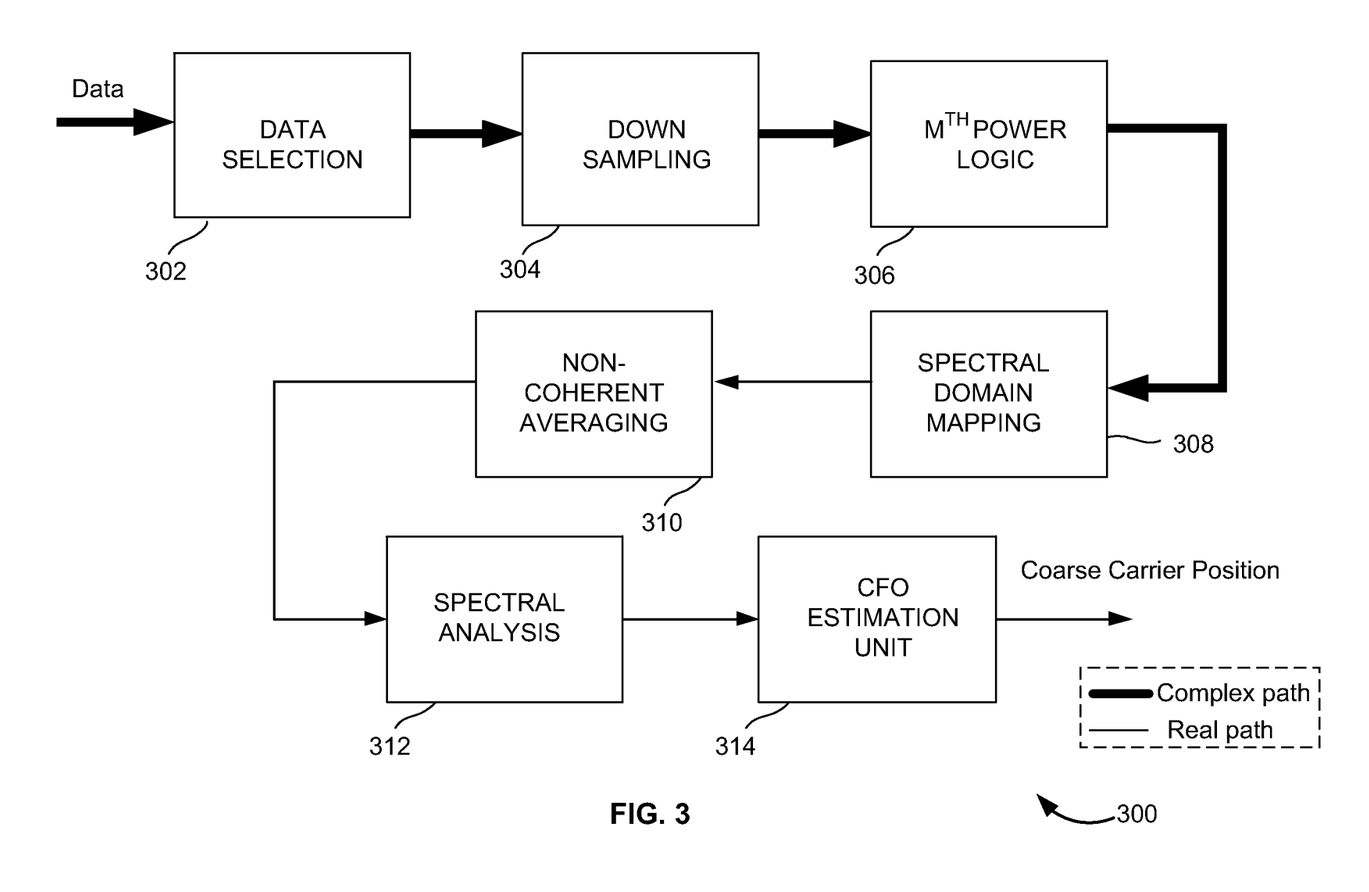
FIG. 3 is a block diagram of the receiver of FIG. 2 illustrating estimation of the CFO for constant phase preamble based standards according to an embodiment herein.

FIG. 3 is a block diagram of the receiver 200 of FIG. 2 illustrating estimation of the CFO for constant phase preamble based standards according to an embodiment herein. The block diagram 300 includes a data selection unit 302, a down-sampling unit 304, a $M^{th}$ power logic unit 306, a spectral domain mapping unit 308, a non-coherent averaging unit 310, a spectral analysis unit 312, and a carrier frequency offset estimation unit 314. The data is selected such that one or more preambles are selected at the data selection unit 302 when frame boundaries are not known during carrier frequency synchronisation. Data selection is limited by complexity involved in spectral mapping as well as resolution required for CFO analysis. The selected signal p(n) may be expressed in accordance with an equation:

$$p(n) = x(n), \quad \text{if } o < n < k$$
$$= 0, \quad \text{if, } n \text{ is not an } \textit{alement} \text{ of set } (o, k)$$

x(n) is signal with M-PSK modulated standard and k is based on down-sampling factor and spectral resolution requirements.

Post data selection at the data selection unit 302, the down-sampling unit 304 downsamples the selected signal is down. The down-sampling is required to obtain better resolution after spectral mapping for a given spectral mapping length. The down-sampling enables reliable estimates in low SNR and strong multipath conditions (e.g., 0 dB echoes). The down-sampling ratio is selected as power of two to reduce complexity involved in sampling rate conversion. In one embodiment, the selected signal p (n) is downsampled by a factor (D) that results in $p_d$ (n) with length N. The $M^{th}$ power logic unit 306 removes strong harmonic carrier with modulation in downsampled signals. In one embodiment, $M^{th}$ power of downsampled $p_d$ (n) generates a signal in accordance with the following equation:

$$q(n) = |pd(n)|^M, \quad \text{if } o < n < N$$
$$= 0, \quad \text{if, } n \text{ is not an } \textit{alement} \text{ of set } (o, N)$$

The spectral domain mapping unit 308 spectral maps by computing complex Fast Fourier Transform (FFT) Q(k), using N points FFT over the predetermined data q(n), in accordance with the equation:

$$Q(k) = \sum_{n=0}^{N-1} q(n)^M e^{-j2\pi kn/N}$$

where, k=0, 1, 2, 3 ... N−1
n=0, 1, 2, 3 ... N−1

In low SNR conditions, the non-coherent averaging unit 310 averages the spectral mapped data. Averaging is done non-coherently to avoid affect of phase variation on CFO estimations. The processes from the data selection unit 302 till the non-coherent averaging unit 310 are repeated according to predefined averaging iterations. The averages spectral mapping output is expressed in accordance with the equation:

$$Q_{avg}(k, j) = \sum_{n=0}^{N-1} Q_{avg}(k, j-1) + |Q(k)|$$

where, k=0, 1, 2, 3 ... N−1
j=number of iterations
$Q_{avg}$=array of zeros with length equals to N A peak search is performed on the averaged spectral mapping output to detect $M^{th}$ harmonic of the carrier in the spectral analysis unit 312. Peak position ($P_{POS}$) is sent to the carrier frequency offset estimation unit 314 to estimate the CFO.

The carrier frequency offset estimation unit 314 estimates the CFO based on the peak position ($P_{POS}$) in accordance with an equation:

$$\delta f = P_{POS}/MNT_s$$

where $T_s$=sampling rate at which spectral mapping is done

Figure 4:
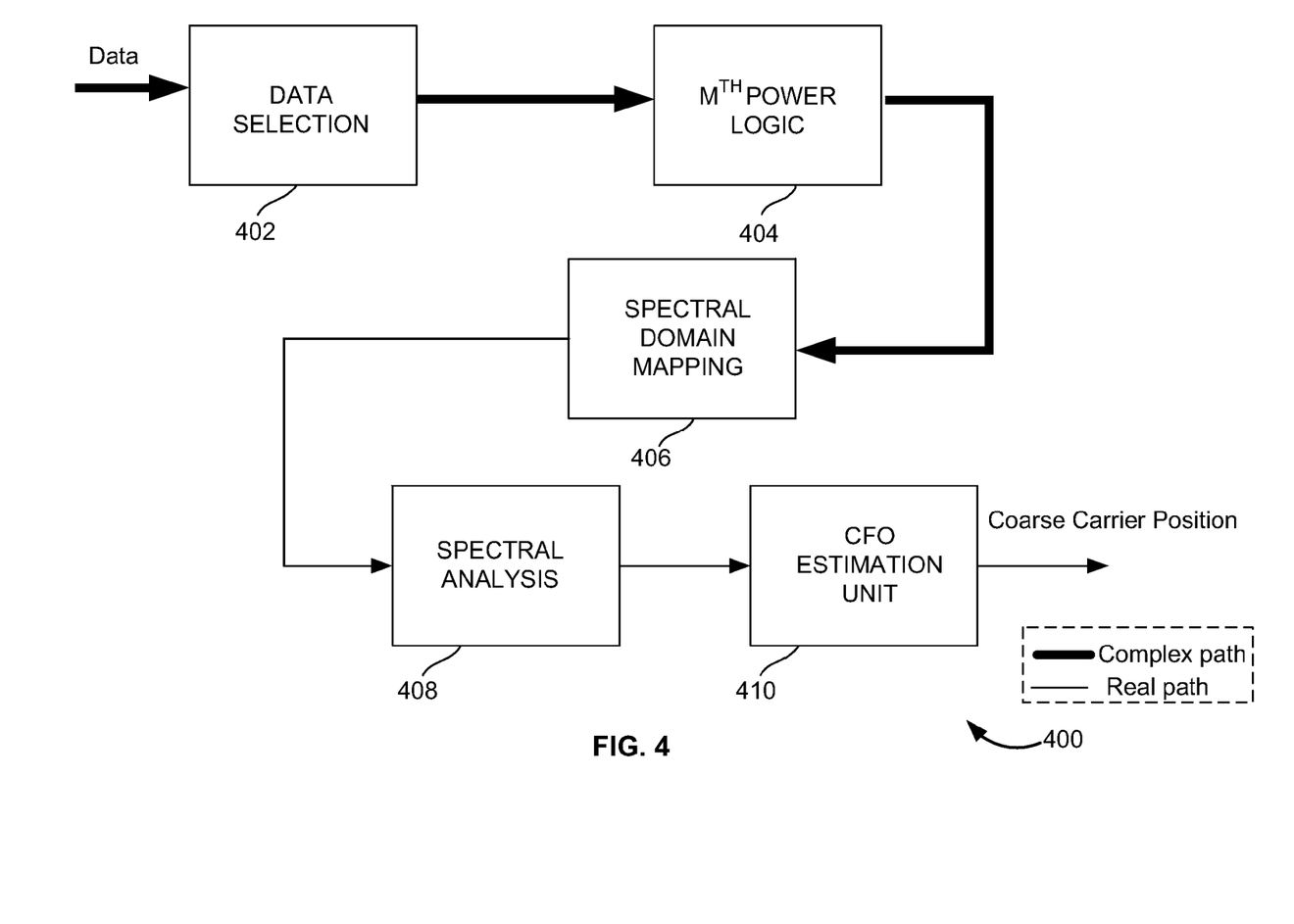
FIG. 4 is a block diagram of the receiver of FIG. 2 illustrating estimation of the CFO estimation for variable phase preamble based standards according to an embodiment herein.

FIG. 4 is a block diagram of the receiver of FIG. 2 illustrating estimation of the CFO estimation for variable phase preamble based standards according to an embodiment herein. The block diagram 400 includes a data selection unit 402, an $M^{th}$ power logic unit 404, a spectral domain mapping unit 406, a spectral analysis unit 408, and a carrier frequency offset estimation unit 410.

Preambles with variable phase generate multiple peaks after spectral mapping. Therefore, data selection is performed such that only one preamble is selected. For variable phase preamble standards, down-sampling is not performed. Therefore data selection directly influences size of spectral mapping. The selected signal p(n) is expressed in accordance with an equation:

$$p(n) = x(n), \text{ if } o < n < k$$
$$= 0, \quad \text{if, } n \text{ is not an } alement \text{ of set } (o, k)$$

x(n) is signal with M-PSK modulated standard and k is based on down-sampling factor and spectral resolution requirements.

The $M^{th}$ power logic unit 404 removes strong harmonic carrier with modulation. In one embodiment, $M^{th}$ power of selected signal p(n) generates signal $q(n)=|p(n)|^M$ when 'n' lies between 0 and N. Signal q(n)=0 is generated when value of 'n' lies outside the interval [0, N]. The spectral domain mapping unit 406 performs spectral mapping by computing complex Fast Fourier Transform (FFT) Q(k), using N points FFT over the predetermined data q(n), in accordance with the equation:

$$Q(k) = \sum_{n=0}^{N-1} q(n)^M e^{-j2\pi kn/N}$$

where, k=0, 1, 2, 3 ... N-1
n=0, 1, 2, 3 ... N-1

The spectral analysis unit 408 performs a peak search on the spectral domain mapping output to detect $M^{th}$ harmonic of the carrier in the spectral analysis unit 408. For reliable estimates, spectral analysis is performed for different sets of the selected signal. Hence, the processes from the data selection unit 402 till spectral analysis unit 408 are repeated according to predefined spectral analysis iterations. On selecting a consistent Peak position ($P_{POS}$), it is sent to the carrier frequency offset estimation unit 410 to estimate the CFO.

Figure 5:
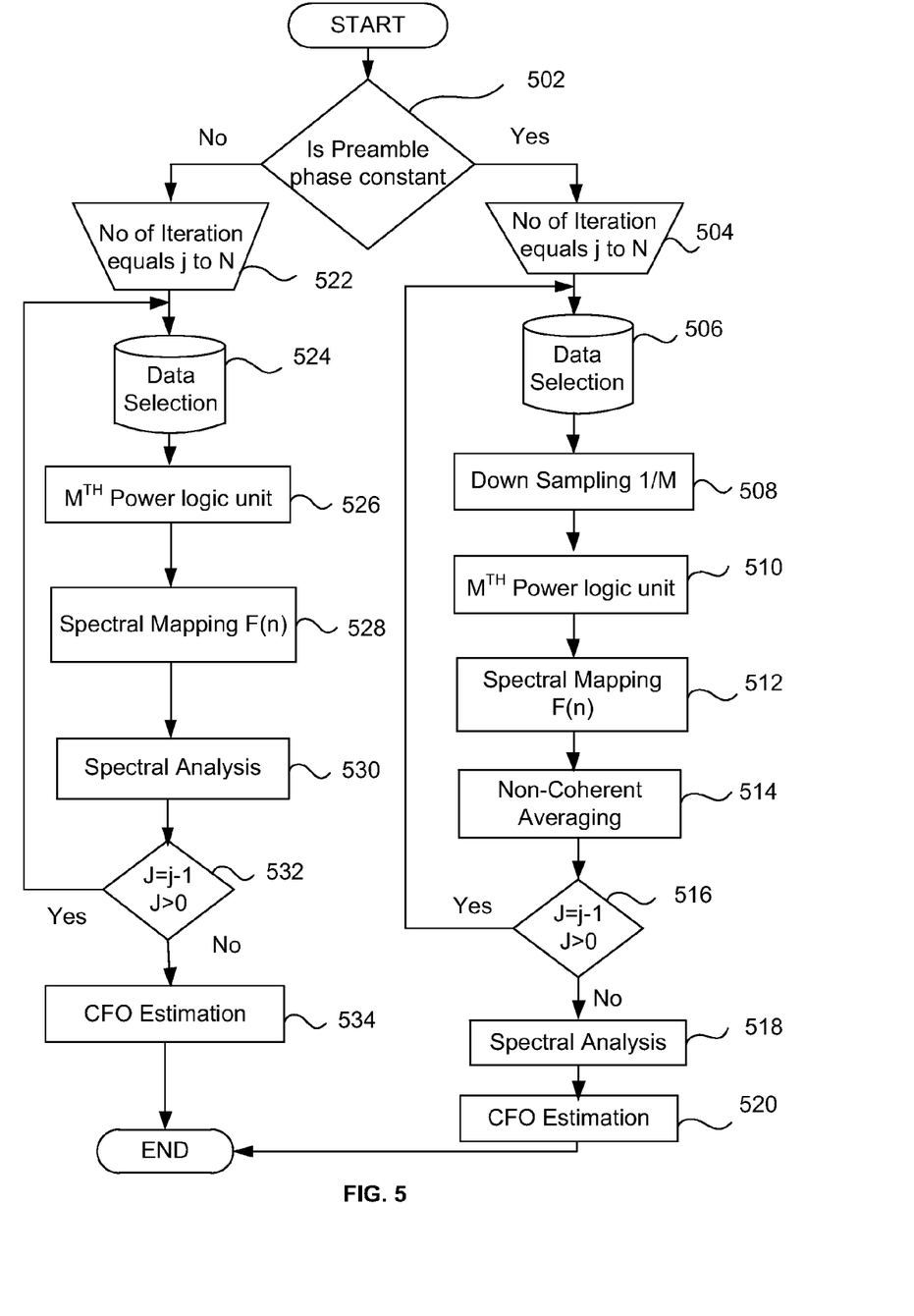
FIG. 5 is a flow chart illustrating a process of estimating the CFO for constant and variable phase preamble based standards according to an embodiment herein.

The carrier frequency offset estimation unit 410 estimates the CFO based on the peak position ($P_{POS}$) in accordance with an equation:

$\delta f = P_{POS}/MNT_s$ where $T_s$=sampling rate at which spectral mapping is done With reference to FIG. 3 and FIG. 4, FIG. 5 is a flow chart illustrating a process of estimating the CFO for constant and variable phase preamble based standards according to an embodiment herein. In step 502, it is checked whether the condition of a preamble phase for received signal standards is constant is true. If the step 502 is true, then a number of iterations j equaling N are predefined in step 504 and wherein N is an integer value. In step 506 data selection is performed to output a selected signal p (n). In step 508, selected signal p(n) is downsampled to obtain better resolution for the spectral mapping. In step 510, carrier Mth harmonic with no modulation is generated. In step 512, the carrier Mth harmonic is spectrally mapped by computing complex Fast Fourier Transform (FFT) Q(k), using N points FFT over the predetermined data q(n). In step 514, a non-coherent averaging is performed over the spectral mapping output to avoid affect of phase variation on CFO estimations. In step 516, a value of 'j' is decremented (e.g., j=j-1) and it is checked whether the value of 'j' is greater than 0 (j>0)

If the condition in step 516 is true, the steps 506-514 are repeated. In one embodiment, the steps 506-514 are repeated to obtain consistent results. In step 518, spectral analysis of the averaged spectral mapping output is performed by a peak search to detect $M^{th}$ harmonic carrier to obtain a consistent peak position $P_{POS}$. In step 520, the CFO is estimated based on the peak position.

If the condition in step 502 is false, then a number of iterations j equaling N and wherein N is an integer value in step 522. In step 524, data selection is performed to output a selected signal p (n). In step 526, carrier $M^{th}$ harmonic signal with no modulation is generated for the selected signal p(n). In step 528, the carrier $M^{th}$ harmonic signal is spectrally mapped by computing complex Fast Fourier Transform (FFT) Q(k), using N points FFT over the selected signal p(n). In step 530, a peak search is performed on the spectral mapping output to detect $M^{th}$ harmonic in the spectral mapping output and to obtain a consistent peak position $P_{POS}$. In step 532, a value of 'j' is decremented (e.g., j=j-1) and it is checked whether the value of 'j' is greater than 0 (j>0). If j is greater than 0, the steps 522-530 are repeated to obtain consistent results. In step 534, the CFO is estimated based on the peak position determined in the step 530.

The embodiments herein discussed about system and method for CFO estimation in a receiver. The present embodiments provide a generic solution applicable to all preamble based digital communication standards. The CFO estimation is reliable even in low signal to noise ratio (SNR) and strong multipath conditions. The multipath conditions include all strong profiles, like echoes with 0 db strength. The CFO estimation is independent of sampling time offsets (STO), hence concurrent estimation of CFO and STO is possible thus leading to reduced acquisition time. The CFO estimation can be performed anywhere in the signal chain prior to the frame synchronization.

Figure 6:
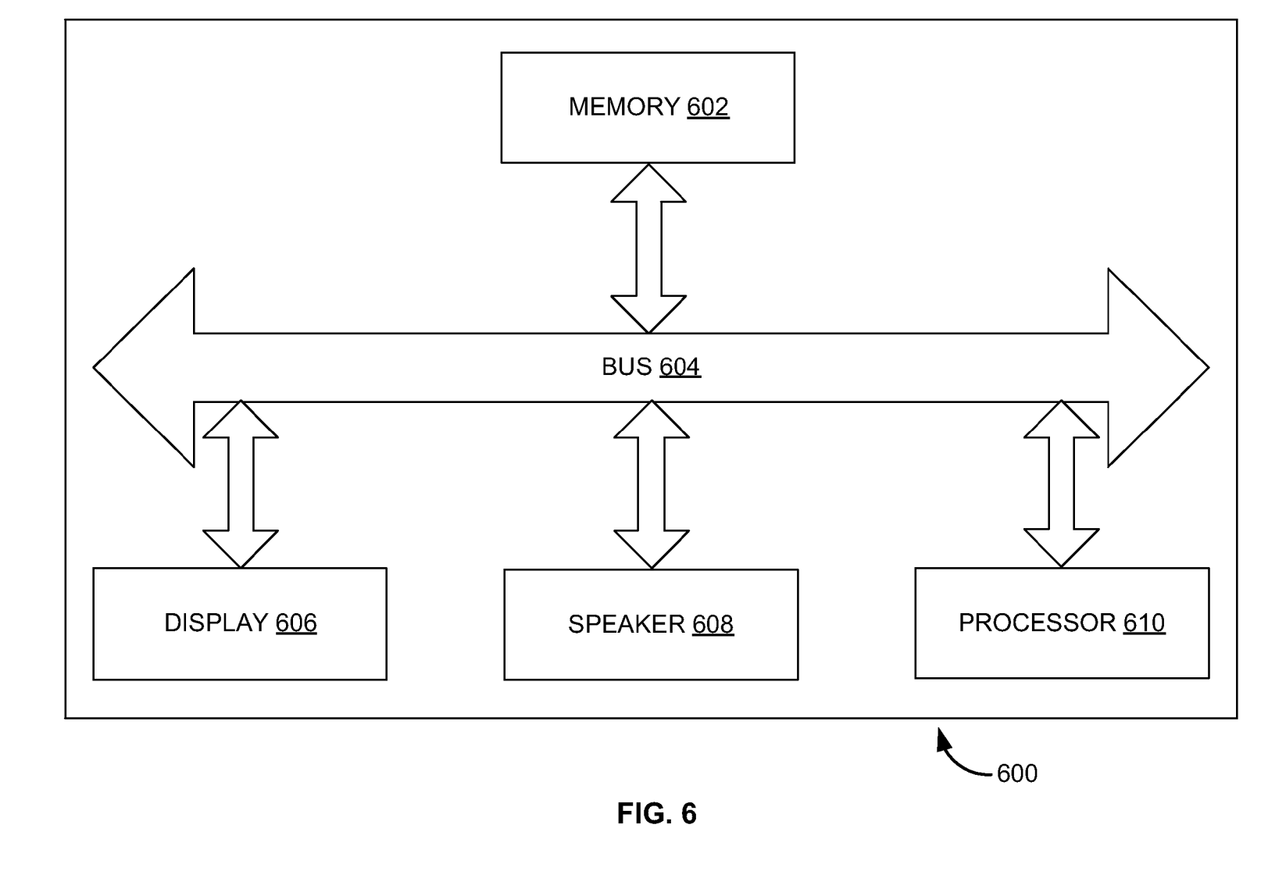
FIG. 6 illustrates an exploded view of a receiver having an a memory having a set of computer instructions, a bus, a display, a speaker, and a processor capable of processing the set of computer instructions to perform any one or more of the methodologies herein, according to an embodiment herein.

FIG. 6 illustrates an exploded view of a receiver 600 having an a memory 602 having a set of computer instructions, a bus 604, a display 606, a speaker 608, and a processor 610 capable of processing the set of computer instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein. Digital content may also be stored in the memory 602 for future processing or consumption. The memory 602 may also store program specific information and/or service information (PSI/SI), including information about digital content (e.g., the detected information bits) available in the future or stored from the past.

A user of the receiver 600 may view this stored information on display 606 and select an item for viewing, listening, or other uses via input, which may take the form of keypad, scroll, or other input device(s) or combinations thereof. When digital content is selected, the processor 610 may pass information. The content and PSI/SI may be passed among functions within the receiver 600 using bus 604. In one embodiment, the receiver 600 is the same receiver 200 of FIG. 2.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A receiver for reducing acquisition time of a Carrier Frequency Offset (CFO) of an input intermediate frequency (IF) signal with M-ary Phase Shift Keying (M-PSK) modulated preamble, said receiver comprising:
    an analog to digital converter (ADC) that converts said input IF signal into a digital signal;
    a down conversion unit that down converts said digital signal to a baseband complex signal; and
    a CFO estimation block that estimates said CFO using spectral based analysis, wherein said CFO estimation block comprises:
        a carrier harmonic generation unit that generates an output of a carrier Mth harmonic without modulation from said baseband complex signal;
        a spectral mapping unit that spectrally maps said carrier Mth harmonic using a complex Fast Fourier Transform (FFT) and generates a spectrally mapped carrier Mth harmonic signal;
        a spectral analysis unit that performs a peak search on said spectrally mapped carrier Mth harmonic signal to obtain a peak position (PPOS); and
        a Carrier Frequency Offset (CFO) estimation unit that estimates the CFO based on said peak position (PPOS);
    wherein said receiver is capable of supporting wire-line as well as wireless standards, and wherein an estimation of said CFO is carried out at said symbol rate to reduce implementation complexity.

2. A receiver for reducing acquisition time of a Carrier Frequency Offset (CFO) of an input intermediate frequency (IF) signal with M-ary Phase Shift Keying (M-PSK) modulated preamble, said receiver comprising:
    an analog to digital converter (ADC) that converts said input IF signal into a digital signal;
    a down conversion unit that down converts said digital signal to a baseband complex signal; and
    a CFO estimation block that estimates said CFO using spectral based analysis, wherein said CFO estimation block comprises (a)-(d):
    (a) a carrier harmonic generation unit that generates an output of a carrier Mth harmonic without modulation from said baseband complex signal;
    (b) a spectral mapping unit that spectrally maps said carrier Mth harmonic using a complex Fast Fourier Transform (FFT) and generates a spectrally mapped carrier Mth harmonic signal;
    (c) a spectral analysis unit that performs a peak search on said spectrally mapped carrier Mth harmonic signal to obtain a peak position (PPOS); and
    (d) a Carrier Frequency Offset (CFO) estimation unit that estimates the CFO based on said peak position (PPOS);
    wherein said receiver further comprises:
    a signal conditioning filter that rejects unwanted out-of-band signals from said baseband complex signal;
    a sample rate converter that converts said baseband complex signal to a symbol rate;
    a numerically controlled oscillator (NCO) that generates a complex signal for a down conversion; and
    a coherent demodulator connected to said sample rate converter, wherein said coherent demodulator demodulates said baseband complex signal.

3. A receiver for reducing acquisition time of a Carrier Frequency Offset (CFO), with constant phase M-ary Phase Shift Keying (M-PSK) modulated preamble of an input Intermediate Frequency (IF) signal, said receiver comprising:
    a down conversion unit that down converts said input IF signal into a baseband complex signal; and
    a CFO estimation block that comprises:
        a data selection unit that selects a data p(n) based on at least constant phase M-PSK modulated preamble of said baseband complex signal;
        a down-sampling unit that downsamples said baseband complex signal to obtain a downsampled signal;
        an Mth power logic unit that processes said downsampled signal and generates a carrier Mth harmonic signal without modulation;
        a spectral domain mapping unit that spectrally maps said carrier Mth harmonic signal by computing a complex Fast Fourier Transform (FFT) and generates a spectrally mapped signal;
        a non-coherent averaging unit that generates an averaged spectrally mapped signal by averaging a magnitude of said spectrally mapped signal with a magnitude of signal that is previously spectrally mapped;
        a spectral analysis unit that performs a peak search on said averaged spectrally mapped signal to detect Mth harmonic of said baseband complex signal and obtains a peak position (PPOS); and
        a carrier frequency offset estimation unit that estimates said CFO based on said peak position.

4. The receiver of claim 3, wherein a down-sampling of said baseband complex signal enables reliable CFO estimates in low SNR condition and strong multipath.

5. A method for reducing acquisition time of a Carrier Frequency Offset (CFO) of an input intermediate frequency (IF) signal, with Mth power of a phase M-ary Phase Shift Keying (M-PSK) modulated preamble of said input IF signal in a receiver, said method comprising:
    performing a first set of operations when said phase of said M-PSK modulated preamble is constant, said first set of operations comprising (a)-(e):
    (a) performing a data selection to output a selected signal p(n);
    (b) down-sampling said selected signal p(n) to obtain better resolution for a spectral mapping;
    (c) generating a carrier Mth harmonic without modulation of said selected signal p(n);
    (d) spectrally mapping said carrier Mth harmonic by computing a complex Fast Fourier Transform to obtain a spectrally mapped signal; and
    (e) performing a non-coherent averaging for said spectrally mapped signal to avoid affect of phase variation on CFO estimations to obtain an averaged spectrally mapped signal; and
    performing a spectral analysis of said averaged spectrally mapped signal based on a peak search to obtain a peak position (PPOS); and
    estimating said CFO based on said PPOS.

6. The method of claim 5, further comprising:
    setting a number of iterations j to a value N before performing said first set of operation;
    decrementing a value of said j after said non-coherent averaging is performed; and
    performing said spectral analysis only when said j is 0;
    wherein said first set of operations are performed again when said value of j is greater than 0.

7. The method of claim 5, further comprising:
    performing a second set of operations when said phase of said M-PSK modulated preamble is variable, said second set of operations comprising (f)-(i):

(f) performing a data selection to output a selected signal p(n),
(g) generating a carrier Mth harmonic signal without modulation of said selected signal p(n),
(h) spectrally mapping of said carrier Mth harmonic signal of said selected signal by computing a complex Fast Fourier Transform to obtain a spectrally mapped signal, and
(i) performing a spectral analysis of said spectrally mapped signal based on a peak search to detect Mth harmonic of said selected signal and to obtain a peak position (PPOS); and estimating said CFO based on said PPOS.

8. The method of claim 7, further comprising:

setting a number of iterations j to a value N before performing said data selection to output said selected signal p(n);

decrementing a value of said j after performing said spectral analysis; and estimating said CFO based on said PPOS only when j is 0;

wherein said second set of operations are performed again when said value of j is greater than 0.

9. The method of claim 2 wherein:

said receiver is capable of supporting wire-line as well as wireless standards; and an estimation of said CFO is carried out at said symbol rate to reduce implementation complexity.

* * * * *